United States Patent [19]
Little et al.

[11] Patent Number: 5,653,040
[45] Date of Patent: Aug. 5, 1997

[54] ONE TOUCH FACE GAGE FOR VEHICLE WHEELS

[75] Inventors: Billy K. Little, Howell; Michael C. Martin, East Lansing, both of Mich.

[73] Assignee: Hayes Wheels International, Inc., Romulus, Mich.

[21] Appl. No.: 547,173

[22] Filed: Oct. 24, 1995

[51] Int. Cl.⁶ .................................................. G01B 3/22
[52] U.S. Cl. ........................................ 33/833; 33/203
[58] Field of Search ............................. 33/832, 833, 836, 33/203, 203.11, 203.12, 203.18, 203.19

[56] References Cited

U.S. PATENT DOCUMENTS

| | | | |
|---|---|---|---|
| 2,654,156 | 10/1953 | Boyer | 33/836 |
| 2,869,331 | 7/1959 | Horst | 33/203 |
| 3,479,743 | 11/1969 | Zemberry | 33/836 |
| 3,938,254 | 2/1976 | Miller, Jr. | 33/836 |
| 4,577,412 | 3/1986 | McKinney | 33/833 |
| 5,033,003 | 7/1991 | Lee, Sr. | 33/203.18 |
| 5,131,159 | 7/1992 | Takahashi et al. | 33/833 |
| 5,189,808 | 3/1993 | Evans et al. | 33/836 |

FOREIGN PATENT DOCUMENTS

| | | | |
|---|---|---|---|
| 205244 | 12/1983 | Germany | 33/836 |
| 241302 | 10/1988 | Japan | 33/203 |
| 31106 | 2/1990 | Japan | 33/203 |
| 886068 | 1/1962 | United Kingdom | 33/836 |

Primary Examiner—Thomas B. Will
Attorney, Agent, or Firm—MacMillan, Sobanski & Todd

[57] ABSTRACT

An apparatus for measuring the axial deviation of a vehicle wheel surface relative to a reference plane. The apparatus includes a base which supports the vehicle wheel. A post is mounted upon the base. The post has an axial bore formed therein. The bore has an end surface which is a known axial distance from the reference plane. The apparatus also has a housing adapted to contact a plurality of points located on a surface of the wheel, the plurality of points defining an annular surface on a portion of the wheel face. The apparatus further includes a gage mounted in the housing. The gage has a probe which is received by the post bore. The gage is operative to measure the deviation of the axial distance between the annular surface on the wheel face and the reference plane.

17 Claims, 4 Drawing Sheets

ONE TOUCH FACE GAGE FOR VEHICLE WHEELS

BACKGROUND OF THE INVENTION

This invention relates in general to vehicle wheels and in particular to an apparatus for measuring axial deviation of a vehicle wheel surface relative to a reference plane.

Vehicle wheels typically include an annular wheel rim and a circular wheel disc. The wheel disc can be formed across the outboard end of the wheel rim or recessed within the wheel rim. The wheel rim is adapted to carry a pneumatically inflated tire. The wheel rim has inboard and outboard tire retaining flanges formed on the ends thereof which extend in an outward radial direction to retain the tire on the wheel. Inboard and outboard tire bead seats are formed on the outer surface of the wheel rim adjacent to the corresponding tire retaining flange to support the tire walls and form an air-tight seal therewith. The wheel rim also includes a reduced diameter drop well between the tire bead seats to facilitate mounting the tire upon the wheel.

The wheel disc includes a central wheel hub for mounting the wheel upon a vehicle. The inboard face of the wheel hub is typically machined to form it flat surface to assure good contact between the wheel and the vehicle. A pilot hole and a plurality of wheel stud holes extend through the wheel hub. The pilot hole is centered on the hub and the stud holes are spaced equally about a circle which is concentric with the pilot hole. The pilot hole can receive the end of an axle while the wheel stud holes receive wheel studs for attaching the wheel to a vehicle. The wheel disc also typically includes a plurality of wheel spokes which extend radially from the wheel hub to the wheel rim and support the hub within the rim.

Vehicle wheels can be cast in a single piece from a light weight metal such as aluminum, magnesium or titanium, or an alloy of a light weight metal. Such wheels are becoming increasingly popular because they weigh less than conventional steel wheels and can include outboard wheel disc faces which are formed in a pleasing atheistic shape. One piece wheel castings are usually formed by a gravity or low pressure casting process. The wheel castings are finished by machining to a final shape.

Two separate machining operations are typically used to finish a wheel casting. Referring now to the drawings, a wheel finishing process with two machining operations is illustrated in the flow chart shown in FIG. 1. In functional block 10, the outboard end of a rough wheel casting is clamped to the face of a wheel lathe for the first machining operation. A wheel lathe is a dedicated machine designed to finish wheels. Wheel lathes typically include a plurality of cutting tools and are operated under computer numerical control (CNC) to perform a number of related machining operations. For example, a wheel lathe can be equipped with a turning tool, a facing tool and a drill bit and be programmed to sequentially ram, face and bore a wheel casting. The wheel lathe face typically includes a plurality of jaws which grip the outboard wheel retaining flange and tire bead seat. Consequently, the outboard wheel rim end is not finished during the first machining operation.

Figure 1:
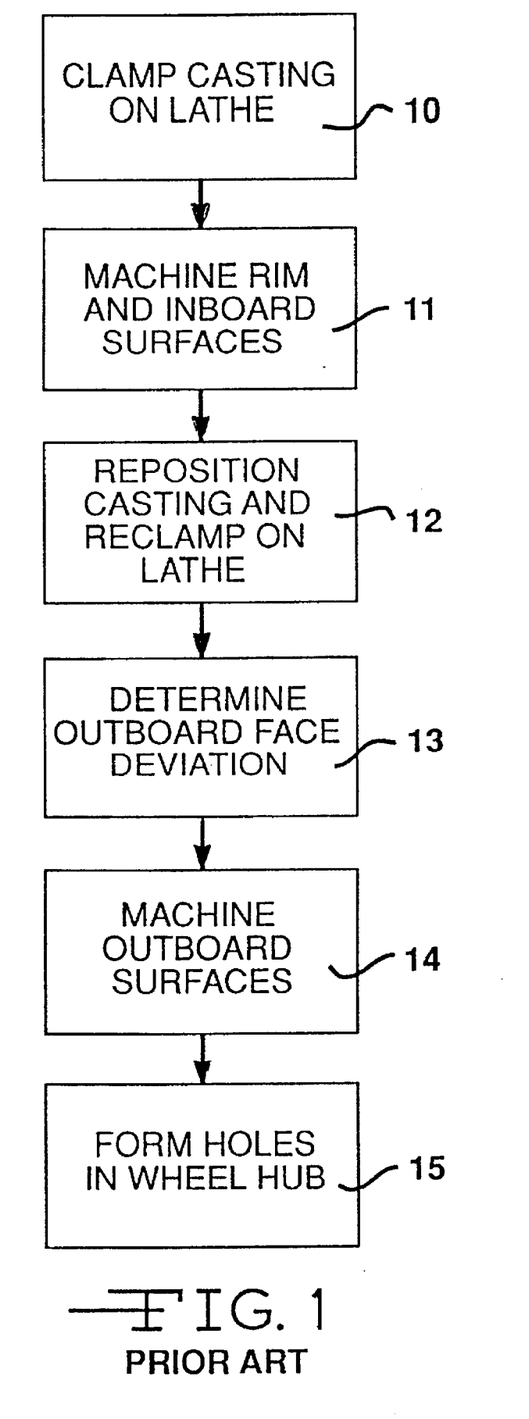
FIG. 1 is flow chart of a known process for machining a vehicle wheel casting.

The outside and inside surfaces of the wheel rim are turned to their final shapes and the inboard surface of the wheel hub is faced in functional block 11. Additionally, the inboard end of the wheel rim is finished. The partially finished wheel casting is removed from the wheel lathe, reversed and clamped on another wheel lathe for a second machining operation in functional block 12. During the second machining operation, the inboard wheel flange and tire bead seat are gripped by the wheel lathe jaws, exposing the outboard surface of the wheel disc and the outboard end of the wheel rim for machining.

After clamping the wheel on the lathe, an axial distance between a portion of the surface of the outboard wheel casting face and a reference plane is measured in functional block 13. The reference plane is defined by a finished surface on the wheel, such as the inboard end of the wheel rim. The measured axial distance is compared to a desired axial distance to determine an axial deviation for the wheel casting outboard face.

It is necessary to determine the axial deviation of the outboard wheel face in functional block 13 because the axial dimensions of castings can vary from wheel to wheel. The variation of the axial dimensions can be the result of slight deformations of the wheel castings which can occur as the castings are pulled from the wheel mold. Additionally, metal shrinkage can cause variation in the thickness of portions of the wheel discs. Thus, it is not sufficient to finish the outboard wheel face by simply following the surface contour of the wheel casting face during the second machining operation. Doing so can result in cosmetic differences between the appearance of finished wheels and/or undesirable fitment of wheel trim pieces. For example, variation of the axial dimensions of the hubcap retention area may cause hubcaps, which are intended to be flush with the wheel face surface, to be recessed when mounted upon some of the finished wheels. Alternately, the variation may cause the hubcaps to extend above the wheel face surface.

Accordingly, it is known to determine the axial deviation between an axial dimension of a critical portion of the outboard surface of the wheel disc casting and a corresponding surface on a desired finished wheel surface. This axial deviation is used to determine the amount of metal to be removed during the second machining operation to assure that the finished wheel surface is within tolerances of the desired wheel surface.

It also is known to include mechanical or electronic probes on a wheel lathe to measure the axial distance between the face of the wheel casting and the reference plane while the wheel casting is clamped on the lathe. The measurement can be made before starting the second machining operation, as shown in the flow chart, or the lathe can be stopped during the second machining operation for the measurement. In either case, a series of probe readings of points located on the critical portion of the wheel face are taken. For example, if the fit of hubcaps is a concern, the axial variation of the surface of the hubcap retention area is determined. First, a series of points surrounding the pilot hole are measured. Because only a single probe is typically available, the wheel is indexed to align each of the points with the probe. At least three data points are measured to define the surface which is critical to proper machining of the wheel. The data points are used to define actual axial distances between the surface points and the reference plane. The differences between the actual axial distances and corresponding desired axial distances are combined to provide an axial deviation.

In functional block 14, the second machining operation turns and faces the outboard wheel face. During this operation, the outboard tire retaining flange and the outboard tire bead seat also are mined to final shapes. The surface of the hubcap retention area is machined to final shape and the stud mounting holes are drilled through the hub in functional block 15. Alternately, the wheel casting may be removed from the wheel lathe and the drilling operation completed at another work station.

SUMMARY OF THE INVENTION

This invention relates to an apparatus and method for determining the axial deviation of a vehicle wheel surface relative to a reference plane.

As described above, it is known to use a lathe mounted probe to measure the axial distance between a critical portion of an outboard wheel face surface and a reference plane defined by a finished surface of the wheel. The measured distance is used to determine the deviation between the actual wheel face and the desired wheel face. The resulting deviation is then used to control the amount of metal removed from the casting during the second machining operation. However, such on-lathe measurement is time consuming, because the surface is defined by a plurality of points and the axial distance between each point and the reference plane is measured in sequence. During the measurement, the lathe is not in operation. Thus, the measuring process increases the total time required for machining a wheel. Additionally, the measurement takes place within the lathe in the presence of metal chips and coolant. If chips and/or coolant are on the portion of the wheel face being measured, the measurement may be incorrect. Therefore, a more efficient and accurate method and apparatus for measuring the deviation of the axial dimension is desirable.

The present invention contemplates an apparatus having a gage which is adapted to contact a plurality of points on a vehicle wheel face. The plurality of points define an annual surface which includes the critical surface. The gage is operative to measure an axial distance related to the axial distance between the annular surface and a reference plane defined by a vehicle wheel surface. The gage also can be operative to indicate a deviation between the axial distance from the wheel reference plane and the annular wheel face surface and a known axial distance measured from the reference plane.

The present invention further contemplates that the apparatus includes a base for supporting the wheel surface which defines the reference plane. A post is mounted upon the base and extends upwardly from the base. The post has an axial bore formed therein, the bore having an end surface which is a known axial distance from the reference plane. The apparatus also includes a removable housing adapted to contact the plurality of points located on the vehicle wheel face which define the annular surface. The gage is mounted in the housing and has a probe which is adapted to be received by the post bore.

The present invention further contemplates a method for measuring the axial distance described above which comprises providing the apparatus described above. A vehicle wheel is placed upon the apparatus with the gage contacting the plurality of points on the vehicle wheel face which define the annular surface. The gage is operative to measure an axial distance related to the axial distance between the annular surface and a reference plane defined by a vehicle wheel surface. The gage also can be operative to indicate a deviation between the axial distance from the wheel reference plane and the annular wheel face surface and a known axial distance measured from the reference plane.

The present invention further contemplates providing the measured distance to a wheel lathe controller. The measured wheel is clamped into the wheel lathe. The wheel lathe controller is responsive to the measured distance to machine the wheel to a final shape such that the measured wheel surface is within allowable tolerances of the desired axial distance from the reference plane.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
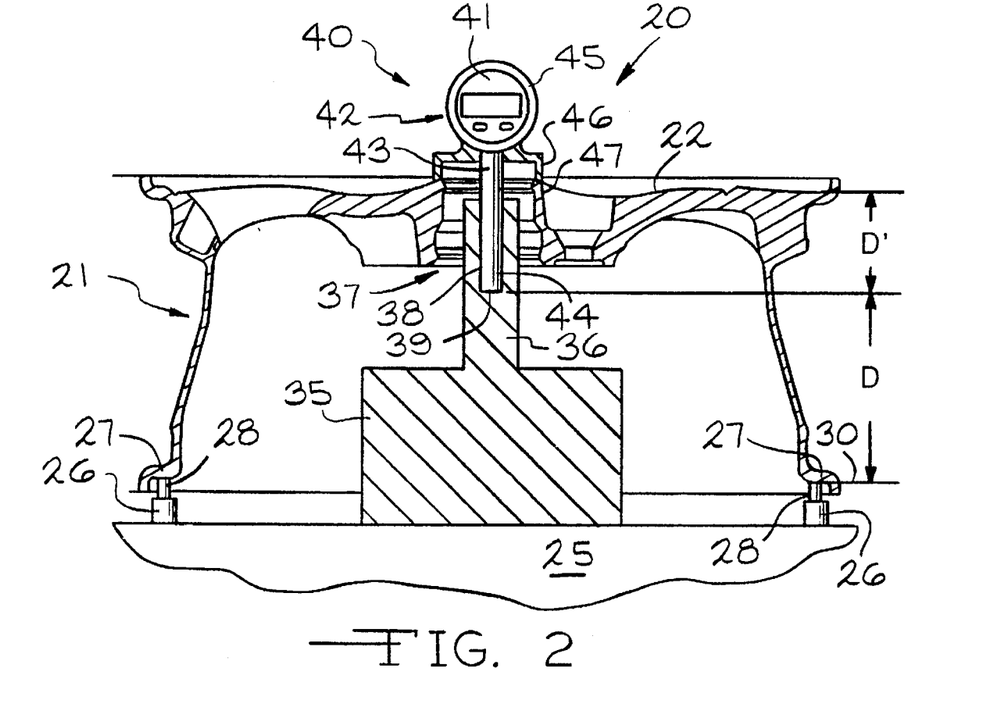
FIG. 2 is a sectional view of a vehicle wheel mounted upon an apparatus for measuring the axial deviation of a wheel face surface in accordance with the present invention.

Referring again to the drawings, there is illustrated in FIG. 2 an apparatus 20 for measuring deviation of the axial distance between a reference plane for a vehicle wheel 21 and a portion of the outboard wheel face surface 22.

The apparatus 20 includes a flat base 25 which is formed from a plate of steel, or a similar metal, and is mounted upon a stand or pedestal (not shown). The base 25 carries a plurality of rest stops 26, two of which are shown in FIG. 2. The rest stops 26 are attached to the base 25 with a conventional means, such as threaded fasteners (not shown). The rest stops 26 are spaced equally about the circumference of a circle which is concentric with, and has the same diameter as, an inboard tire retaining flange 27 of the vehicle wheel 21. Each rest stop 26 has an upper portion 28 which supports the inboard tire retaining flange 27. The upper portions 28 of the rest stops 26 define a reference plane which is labeled 30 in FIG. 2 and which is coplanar with the inboard surface of the inboard tire retaining flange 27.

A center post 35, which extends in an upward direction in FIG. 2, is mounted upon the base 25. The center post 35 is fabricated from steel, or some other durable metal, and is attached to the base 25 with a conventional means, such as threaded fasteners (not shown). The center post 35 is centered upon the rest stops 26 and concentric with the circle described above. In the preferred embodiment, the center post 35 has a stepped cylindrical shape with a reduced diameter upper portion 36 extending into the vehicle wheel pilot hole 37. An axial bore 38 is formed in the upper portion 36 and extends in a downward direction in FIG. 2 from the top of the center post 35. The bore 38 has an end surface 39 which is precisely located a known distance "D" above the reference plane 30.

In the preferred embodiment, the apparatus 20 also includes a gage assembly 40 comprising a mechanical dial indicator gage 41 mounted in a gage housing 42. The dial indicator gage 41 has a probe 43 extending therefrom. The probe 43 is movable in an axial direction. An internal dial indicator gage spring (not shown) urges the probe 43 in an outward direction from the gage 41 in a known manner. The dial indicator gage 41 is operative to measure axial displacement of the probe 43 from a zero position. The dial indicator gage 41 can measure both upward and downward displacement of the probe 43 from the zero position. The measured displacement is displayed on the gage face. The probe 43 is slidably received in the center post bore 38. The probe 43 extends to the bottom of the bore 38 with an end portion 44 contacting the bore end surface 39. While a mechanical dial indicator gage 41 is described above for the preferred embodiment, it will be appreciated that the invention can be practiced with other measuring gages, such as an electronic gage which will be described below.

The gage housing 42 includes an upper portion 45 which carries the dial indicator gage 41. A hollow housing base 46 extends from the housing upper portion 45 toward the wheel face surface 22. The housing base 46 has an open bottom. As shown in FIG. 2, the dial indicator gage probe 43 extends through the base 46 and into the center post bore 38. In the preferred embodiment, the housing base 46 has a cylindrical shape. Accordingly, the housing base 46 has a ring-shaped bottom surface 47 which contacts a plurality of points on the outboard wheel face surface 22. The plurality of points define an annular surface on the wheel face. In FIG. 2, the housing bottom surface 47 contacts the portion of the wheel face which is adjacent to the pilot hole. By increasing the diameter of the housing base 46, other portions of the wheel face can be contacted.

Figure 3:
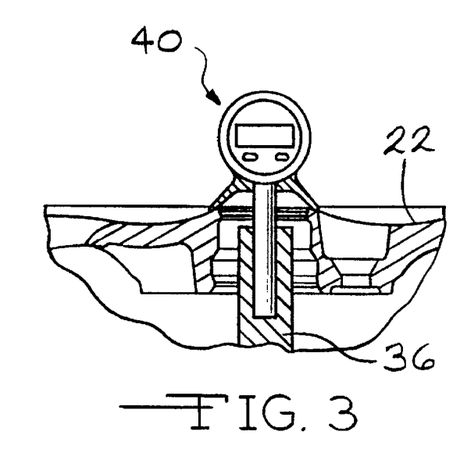
FIG. 3 is a partial sectional view of an alternate housing base for the apparatus shown in FIG. 2.
Figure 4:
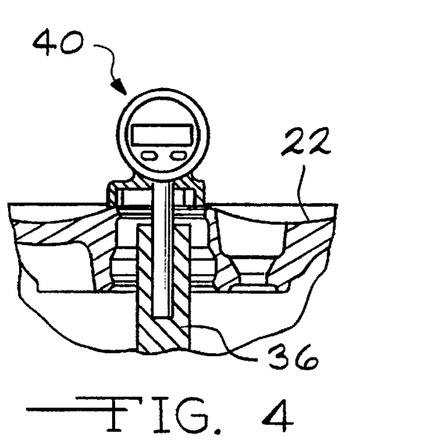
FIG. 4 is a partial sectional view of another alternate housing base for the apparatus shown in FIG. 2.

While the preferred embodiment has a cylindrical gage housing base 46, it will be appreciated that the base also can have a conical shape, as illustrated in FIG. 3. Additionally, the housing base can have a plurality of radially extending arms, as illustrated in FIG. 4. The ends of each arm contact a point on the wheel face.

The operation of the apparatus 20 will now be explained. The apparatus 20 is calibrated before using. In the preferred embodiment, a finished wheel, which is referred to as the "gage wheel" (not shown), is used to calibrate the apparatus 20. The gage wheel has the critical portion of the outboard face surface machined to the correct axial distance from a reference plane, which, for the example wheel shown in FIG. 2, is defined by the inboard surface of the inboard tire retaining flange 27. The gage assembly is removed from the center post 35 to allow positioning of the gage wheel. The gage wheel is positioned with the inboard fire retaining flange resting on the rest stops 26. The rest stops 26 align the gage wheel pilot hole with the center post 35. The upper portion of the center post 36 extends into the gage wheel pilot hole 37.

The gage assembly 40 is placed in position on the outboard wheel face surface. The dial indicator gage housing 42 is placed on the face of the gage wheel with the gage probe 43 extending through the gage wheel pilot hole and into the center post bore 38. The bottom surface 47 of the gage housing base 46 contacts the critical portion of the outboard gage wheel face surface simultaneously at a minimum of three points. The gage spring urges the probe end 44 against the bottom surface 39 of the center post bore 38. The distance between the gage housing bottom surface 47 and the bottom of center post bore 39 is labeled D' in FIG. 2.

With the gage housing 42 positioned on the gage wheel and the gage probe 43 extended into the center post bore 38, the dial indicator gage 41 is set to read "zero". The sum of the distances D+D' is the desired axial distance from the reference plane 30 to the critical portion of the wheel face surface which is to be controlled. Once the gage 41 is calibrated, a zero gage reading corresponds to the desired axial distance of D+D' between the reference plane 30 and the critical wheel face surface. Once the gage 41 is calibrated, the gage assembly 40 is removed from the gage wheel. The gage wheel is then removed from the rest stops 26.

Figure 5:
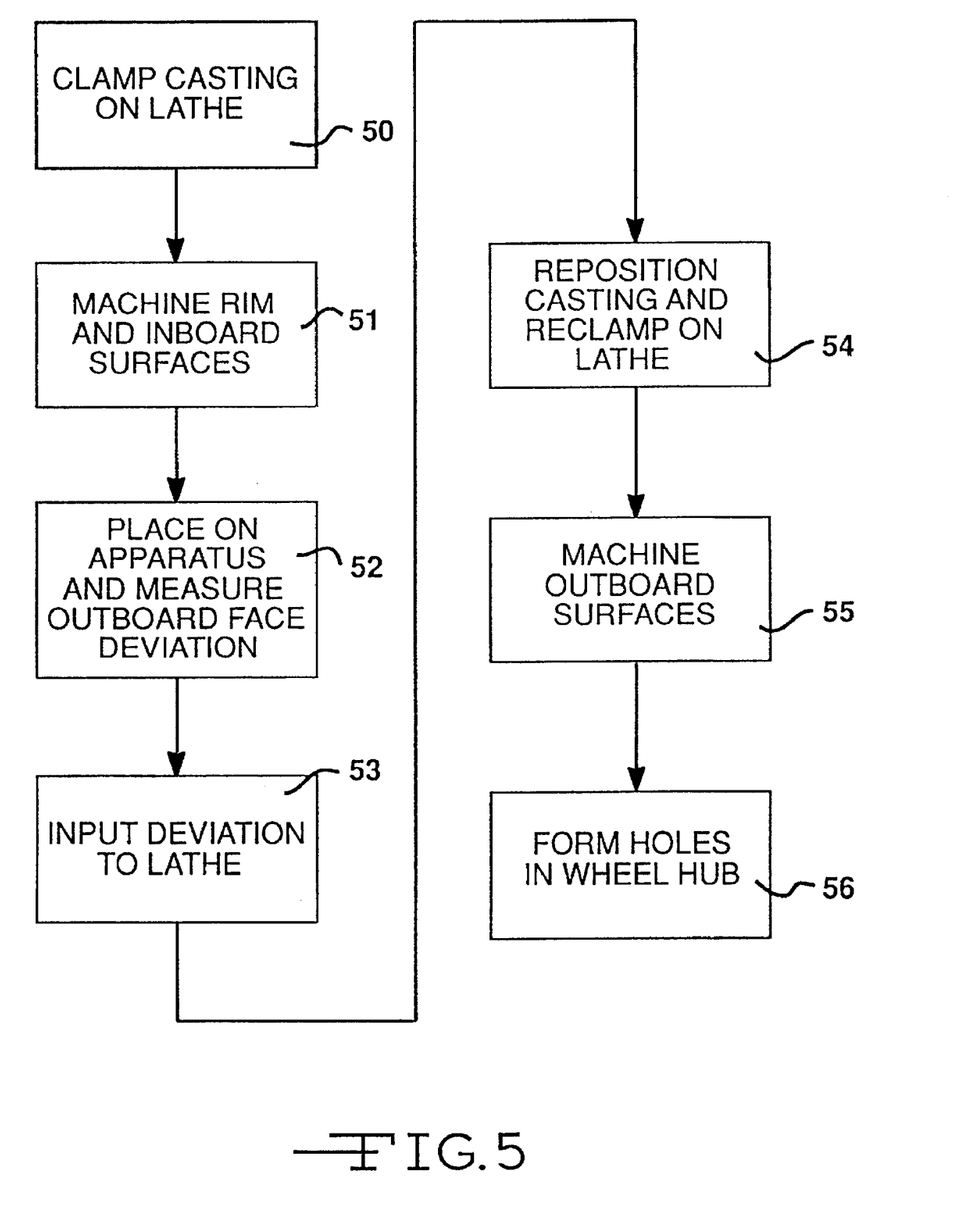
FIG. 5 is a flow chart of a process for machining a vehicle wheel casting which includes the apparatus shown in FIG. 2.

The apparatus 20 is now ready for use in the wheel finishing process which is illustrated by the flow chart shown in FIG. 5. In functional block 50 the outboard wheel retaining flange of a wheel casting is clamped on a wheel lathe. Similar to the process shown in FIG. 1, the inboard end of the wheel and the inner and outer surfaces of the wheel rim are machined to their final shape by an initial machining operation in functional block 51. During the first wheel machining operation, the inboard fire retaining flange is finished, establishing the reference plane 30. Additionally, if the casting does not have a pilot hole formed therethrough, a pilot hole is bored through the center of the wheel hub during the initial machining. The partially finished wheel casting is removed from the wheel lathe and transferred to the apparatus 20.

In functional block 52, the inboard fire retaining flange of the partially finished wheel casting is placed on the rest stops 26 of the apparatus 20. The gage assembly 40 is placed on the wheel face with the gage housing bottom 46 contacting the unfinished outboard wheel face and the dial gage probe 43 extending through the wheel pilot hole and into the center block bore 38. The dial indicator gage spring urges the probe end 44 against the bottom surface 39 of the center post bore 38. The dial indicator gage then directly indicates any deviation from the distance D+D'. If the dial indicator gage reads a positive deviation, the wheel face is a greater axial distance from the reference plane 30 than is desired. If the dial indicator gage reads a negative deviation, the axial distance from the wheel face to the reference plane is less than D+D'. A positive deviation can be reduced during the final machining operation. However, if the negative deviation is outside of acceptable tolerances, final machining will not produce an acceptable wheel and the wheel casting is discarded.

An operator reads the deviation and enters the value into a wheel lathe controller in functional block 53. The deviation can be manually entered into the controller with a numerical touch pad or through an operator interface panel by depressing an "accept" push-button. The lathe controller is responsive to the deviation to control the facing of the wheel such that the distance between the critical wheel face surface and the reference plane 30 is maintained within acceptable tolerances of the desired axial distance. The finished inboard wheel end is clamped to the wheel lathe and the final machining operation is completed in functional block 55. During the final machining, the outboard wheel face, including the surface of the hubcap retention area, and the outboard tire bead seats are machined to final shape. In functional block 56, the wheel stud holes are drilled through the wheel hub. Alternately, the wheel casting may be removed from the lathe and the drilling operation completed at another work station.

The present invention reduces the mount of time required to machine a wheel casting because the measurements are taken externally to the wheel lathe. Accordingly, a wheel can be measured while other wheels are being machined. Accuracy of measurement is improved since the measure is external to the lathe and not subject to inaccuracy due to the presence of metal chips or coolant. Additionally, because a plurality of points on the wheel surface are contacted by the wheel gage housing base 46, the critical wheel face surface is measured with a single touch of the gage housing. Multiple measurements are not needed, reducing the time needed to make the measurement.

Figure 6:
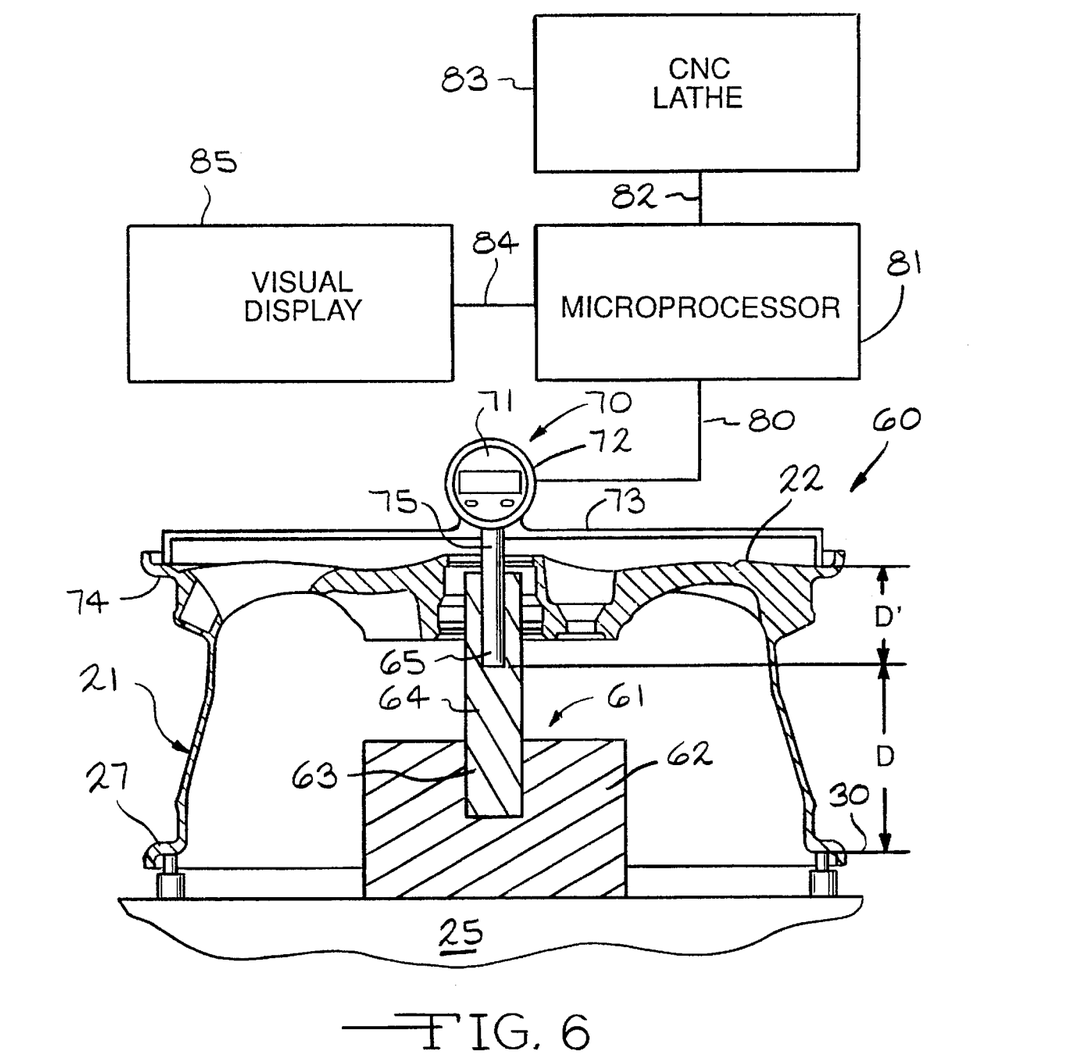
FIG. 6 is a sectional view of an alternate embodiment of the apparatus shown in FIG. 2.

An alternate embodiment of the apparatus 60 is shown in FIG. 6. Components of the apparatus 60 shown in FIG. 6 which are similar to components of the apparatus 20 shown in FIG. 2 are labeled with the same numerical designator. The apparatus 60 includes a two piece center post 61. The center post 61 has a lower portion 62 which is securely mounted upon the base 25. The lower portion 62 has a center bore 63 formed therein. The center bore 63 slidably receives a lower end of a spacer bar 64. The spacer bar 64 has an axial bore 65 formed therein which extends downwardly in FIG. 6 from the upper end of the bar 64. The present invention contemplates a plurality of spacer bars 64 having different lengths with each length corresponding to the width of a specific wheel design. Thus, different width wheels can be measured upon the same apparatus 60 by simply changing the spacer bar 64. As described above, a plurality of rest stops 26 (two of which are shown) are mounted upon the base 25 to support the wheel 21 during measurement.

A gage assembly 70 includes an electronic gage 71 mounted in a gage housing 72. The gage housing 71 has a base 73 which extends radially to rest upon the outboard surface of an outboard tire retaining flange 74. Thus, the gage assembly 70 shown in FIG. 6 is operative to measure the axial deviation of the distance between the outboard surface of the outboard tire retaining flange 74 and the inboard surface of the inboard tire retaining flange 27. The electronic gage 71 has a probe 75 extending therefrom and operates in a similar manner to the mechanical gage 41 described above, except that the gage reading is shown in a digital display and the gage 71 is operative to generate an electrical signal which is a function of the measured deviation.

A first connector 80 connects an output port of the electronic gage 71 to an input port of a microprocessor 81. While a single line is shown in FIG. 6 for the connector 80, it will be appreciated that FIG. 6 is a schematic representation and that the connector 80 may include multiple wires. A second connector 82 connects an first output port of the microprocessor 81 to an input port of a CNC wheel lathe 83. A third connector 84 connects a second output port of the microprocessor 81 to a visual display panel 85. As will be explained below, the microprocessor 81 is operative to illuminate messages to an operator on the display panel 85.

Operation of the alternate embodiment of the apparatus 60 is similar to the operation described above for the apparatus 20. Before placing the apparatus 60 in service, the electronic gage 71 is calibrated with a gage wheel (not shown). After calibration, a partially machined wheel casting is placed upon the rest stops 26 and the gage assembly 70 is positioned on the outboard surface of the wheel face 22. The probe 75 extends into the bore 65 in the spacer bar 64 and contacts the end surface of the bore 65. The gage 71 indicates the amount of axial deviation between the surface of the gage wheel and the corresponding surface of the wheel 21 relative to the reference plane 30. The gage 71 also generates an electrical signal which is proportional to the measured axial deviation. The deviation signal is transmitted over the connector 80 from the gage 71 to the microprocessor 81. The microprocessor 81 is responsive to the deviation signal to adjust the corresponding instructions for the CNC lathe 83 for the second machining operation. When the wheel 21 is mounted upon the CNC lathe 83, the instructions are transferred over the second connector 82 from the microprocessor 81 to the CNC lathe 83. The electronic transfer of data eliminates the potential for human error in transferring data. If the measurement of the wheel 21 produces a negative deviation which can not be corrected during the second machining operation, the microprocessor 81 causes a message to be displayed on a visual display 85 for the operator to "DISCARD" the wheel. Similarly, the visual display 85 displays a "PROCEED" message when the wheel has been measured and found acceptable for the second machining operation.

It will be appreciated that all or some of the features described for the apparatus 60 can be incorporated in the apparatus 20 illustrated in FIG. 2. Additionally, it is possible to have several one touch gage stations to measure more than one critical surface on the partially machined wheel casting. The data would be used as described above to control several critical surfaces during the machining operations. Because the deviation is measured while the lathes are in service machining other wheels, such additional measurements will not increase the time required to machine a wheel.

While the preferred embodiment of the apparatus has been described above in terms of measuring a portion of the surface of a wheel casting, it will be appreciated that the apparatus also can be used to measure surfaces of wheels formed by other manufacturing processes, such as, for example, forging or stamping. Similarly, the apparatus can be used to measure surfaces on fully finished wheels.

Furthermore, while the preferred embodiment has been described as measuring the deviation of an axial dimension, it will be appreciated that the gage also can be calibrated to directly measure the total axial distance, D+D', between the critical wheel face surface and the reference plane.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the inboard surface of the inboard tire retaining flange was used to define the reference plane, other surfaces of the wheel can be used to define the reference plane. Additionally, while the invention has been described in terms of a one piece wheel, it will be appreciated that the invention also can be practiced on a two piece wheel having separately formed wheel disc attached to a separately formed wheel rim. For example, a full face modular wheel disc can be cast or forged and machined to final shape with a two-step machining process which is similar to the process described above. The one touch wheel gage would be used on the wheel disc as described above. After finishing, the wheel disc would be attached to a partial wheel rim to form a complete vehicle wheel.

What is claimed is:

1. An apparatus for measuring an axial distance on a vehicle wheel from a reference plane defined by a surface of the vehicle wheel, the apparatus comprising:

a base for supporting the vehicle wheel, said base contacting and parallel to the surface of the wheel which defines the reference plane;

a post mounted upon said base, said post extending generally perpendicularly from said base;

a housing having a portion which contacts a plurality of points on the vehicle wheel face, said plurality of points defining an annular surface; and a gage mounted in said housing, said gage cooperating with said post to measure an axial distance related to the axial distance between said annular surface and the vehicle wheel reference plane.

2. An apparatus according to claim 1 wherein said housing portion has a cylindrical shape with a base of the cylinder contacting the vehicle wheel face.

3. An apparatus according to claim 1 wherein said housing portion has a conical shape with the base of the cone contacting the vehicle wheel face.

4. An apparatus according to claim 1 wherein said housing portion includes a plurality of radially extending arms, with each arm having an end portion which contacts one of said plurality of points on the vehicle wheel face.

5. An apparatus according to claim 1 wherein said base has a plurality of rest stops mounted thereon, said rest stops spaced equally about the circumference of a circle, said rest stops having ends adapted to support the vehicle wheel by contacting the surface of the wheel which defines the reference plane, said rest stop ends being coplanar with the vehicle wheel reference plane.

6. An apparatus according to claim 5 wherein said post has a bore extending axially into said post from an end which is adjacent to said gage, said bore having an end surface which is a known axial distance from the wheel reference plane and further wherein said gage includes a probe which is received by said bore in said post, said gage measuring said axial distance relative to said bore end surface.

7. An apparatus according to claim 6 wherein said post includes a post base member mounted upon said base and a removable spacer member carried by said post base member, said spacer member including said axial bore which receives said gage probe.

8. An apparatus according to claim 6 wherein said gage indicates a deviation between the axial distance from the wheel reference plane and said annular wheel face surface and a known axial distance measured from said reference plane.

9. An apparatus according to claim 8 wherein said gage is a mechanical dial indicator gage.

10. An apparatus according to claim 1 wherein said gage is electrically coupled to a wheel lathe and further wherein said gage generates an electrical signal which is representative of said axial distance, said electrical signal being supplied to said wheel lathe, said wheel lathe being responsive to said electrical signal to machine said wheel such that the wheel face is a predetermined axial distance from said reference plane.

11. An apparatus according to claim 10 wherein said gage is operative to indicate a deviation between the axial distance from the wheel reference plane and said annular wheel face surface and a known axial distance measured from said reference plane.

12. A method for measuring an axial distance on a vehicle wheel from a reference plane defined by a surface of the vehicle wheel, the method comprising the steps of:

(a) providing a measuring device having a base for supporting the vehicle wheel, the base contacting and parallel to the surface of the wheel which defines the reference plane, a post supported by the base and extending generally perpendicularly therefrom, a housing supported by the wheel the housing having a portion which connects a plurality of points on the vehicle wheel face, the plurality of points defining an annular surface; and a gage mounted in the housing, the gage cooperating with the post to measure an axial distance related to the axial distance between said annular surface and the vehicle wheel reference plane;

(b) positioning a vehicle wheel to be measured upon the base;

(c) positioning the housing on the wheel face with the housing contacting the plurality of points on the wheel face which define the annular surface being measured, and (d) reading the measurement displayed upon the gage.

13. The method according to claim 12 wherein the gage is operative to indicate a deviation between the axial distance from the reference plane and the annular wheel face surface and a known axial distance measured from the reference plane.

14. The method according to claim 13 further including, prior to step (b), calibrating the apparatus by placing a finished vehicle wheel on the apparatus to establish a baseline reading for the gage.

15. A method for machining a vehicle wheel to have an axial distance measured on the wheel from a reference plane defined by a surface of the vehicle wheel, the method comprising the steps of:

(a) providing a measuring device having a base for supporting the vehicle wheel, the base contacting and parallel to the surface of the wheel which defines the reference plane, a post supported by the base and extending generally perpendicularly therefrom, a housing supported by the wheel, the housing having a portion which contacts a plurality of points on the vehicle wheel face, the plurality of points defining an annular surface; and a gage mounted in the housing, the gage cooperating with the post to measure an axial distance related to the axial distance between said annular surface and the vehicle wheel reference plane;

(b) positioning a vehicle wheel to be measured on the base;

(c) positioning the housing on the wheel face with the housing contacting the plurality of points on the wheel face which define the annular surface being measured;

(d) reading the measurement displayed upon the gage;

(e) entering the measurement read in step (d) into a wheel lathe controller;

(f) mounting the wheel on the wheel lathe; and (g) machining the wheel to a finished shape in accordance with the distance measured in step (d).

16. The method according to claim 15 wherein the gage is electrically coupled to the wheel lathe and further wherein, during step (d), the gage generates an electrical signal which is representative of the measured distance, the electrical signal being transferred to the wheel lathe, the wheel lathe being responsive to the electrical signal to machine the wheel to a final shape.

17. The method according to claim 16 wherein the gage is operative to indicate a deviation between the axial distance from the reference plane and the annular wheel face surface and a known axial distance measured from the reference plane.

* * * * *

UNITED STATES PATENT AND TRADEMARK OFFICE
CERTIFICATE OF CORRECTION

PATENT NO.  : 5,653,040
DATED       : August 5, 1997
INVENTOR(S) : Billy K. Little and Michael C. Martin It is certified that error appears in the above-indentified patent and that said Letters Patent is hereby corrected as shown below:

Column 9, Claim 12, Line 9,   change "wheel", to -- wheel, --.

Column 9, Claim 12, Line 10,  after "which", change "connects" to -- contacts --.

Signed and Sealed this

Third Day of February, 1998

BRUCE LEHMAN

*Attest:*

*Attesting Officer*    *Commissioner of Patents and Trademarks*